United States Patent
Lamping et al.

(10) Patent No.: US 8,232,995 B2
(45) Date of Patent: Jul. 31, 2012

(54) LOCAL RELATIVE LAYOUT OF NODE-LINK STRUCTURES IN SPACE WITH NEGATIVE CURVATURE

(75) Inventors: John O. Lamping, Los Altos, CA (US); Ramana B. Rao, San Francisco, CA (US); Tichomir G. Tenev, San Jose, CA (US)

(73) Assignee: SAP America, Inc., Newtown Square, PA (US)

( * ) Notice: Subject to any disclaimer, the term of this patent is extended or adjusted under 35 U.S.C. 154(b) by 2043 days.

(21) Appl. No.: 09/124,805

(22) Filed: Jul. 29, 1998

(65) Prior Publication Data

US 2002/0085002 A1 Jul. 4, 2002

(51) Int. Cl.
*G06T 11/20* (2006.01)
*G06F 15/16* (2006.01)

(52) U.S. Cl. ........ 345/440; 345/441; 345/419; 345/619; 345/629; 345/581; 345/582

(58) Field of Classification Search .................. 345/440, 345/441, 419, 619, 629, 581, 582
See application file for complete search history.

(56) References Cited

U.S. PATENT DOCUMENTS

| | | | | |
|---|---|---|---|---|
| 5,337,404 | A | * | 8/1994 | Baudelaire et al. ........... 345/441 |
| 5,515,487 | A | * | 5/1996 | Beaudet et al. ............... 345/440 |
| 5,590,250 | A | * | 12/1996 | Lamping et al. .............. 345/427 |
| 5,619,632 | A | * | 4/1997 | Lamping et al. .............. 345/441 |

FOREIGN PATENT DOCUMENTS

| | | |
|---|---|---|
| EP | 0 702 330 A | 3/1996 |
| EP | 0 825 559 A | 2/1998 |
| JP | 08076951 | 3/1996 |
| JP | 10-031615 | 2/1998 |

OTHER PUBLICATIONS

Beckett, J., "Computer Whiz Burns to Learn, Ramana Rao wields technology smarts at Xerox startup," *San Francisco Chronicle*, Jun. 4, 1998.

Beier, T., and Neely, S., "Feature-Based Image Metamorphosis," *SIGGRAPH '92, Computer Graphics Proceedings*, vol. 26, No. 2, Chicago, Jul. 1992, pp. 35-42.

(Continued)

*Primary Examiner* — Jin-Cheng Wang
(74) *Attorney, Agent, or Firm* — Mintz, Levin, Cohn, Ferris, Glovsky and Popeo, P.C.

(57) ABSTRACT

A node-link structure is laid out in a space with negative curvature, such as the hyperbolic plane. Nearby relationship data are obtained for an element in the structure, indicating information about nearby node-link relationships; then layout data for the element are obtained, based on the nearby relationship data. The layout data indicate the element's position relative to a parent in the negatively curved space. The layout data can indicate a position displacement and an angle displacement between the parent and the element. The nearby relationship data can be obtained by counting grandchildren of the parent for each child of the parent that is in a set that are being or have been laid out. The counts can be used to obtain a radius and an angle for each child in the set, and the radii and angles can be used to obtain the position displacement and angle displacement. The nearby node-link relationships can thus include only relationships among the parent and its children and grandchildren.

16 Claims, 7 Drawing Sheets

OTHER PUBLICATIONS

Fairchild, K.M., Poltrock, S.E., and Furnas, G.W., "SemNet: Three-Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201-233.

Koike, H., and Yoshihara, H., "Fractal Approaches for Visualizing Huge Hierarchies," *Proceedings of 1993 IEEE/CS Symposium on Visual Languages*, Aug. 24-27, 1993, pp. 55-60.

Lamping, J. and Rao, R., "The Hyperbolic Browser: A Focus+Context Technique for Visualizing Large Hierarchies," Sep. 5, 1995.

Matsuura, T., Taniguchi, K., Masuda, S., and Nakamura, T., "A Graph Editor for Large Trees with Browsing and Zooming Capabilities," *Systems and Computers in Japan*, vol. 24, No. 8, 1993, pp. 35-46.

Munzner, T., Burchard, P., and Chi, E.H., "Visualization through the World Wide Web with Geomview, Cyberview, W3Kit, and WebOOGL," a single page hardcopied from the Web site designated by the URL http://www.ncsa.uiuc.edu/SDG/IT94/Proceedings/VR/munzner/munzner-abstract.html. Hardcopy of changes file from the Web site designated by the URL http://www.geom.umn.edu/software/download/geomview.html, bearing date Oct. 21, 1994.

Munzner, T., and Burchard, P., "Visualizing the Structure of the World Wide Web in 3D Hyperbolic Space," hardcopied from Web site URL http://www.geom.umn.edu:80/docs/research/webviz/ and following sequence of nodes, dated Nov. 21, 1995, also published in Proceedings of VRML. '95, (San Diego, CA, Dec. 14-15, 1995), special issue of Computer Graphics, ACM SIGGRAPH, New York, 1995, pp. 33-38 & 138.

Walsh, J., "Web site development, InXight interface adds animation to site maps," *Infoworld*, May 18, 1998.

Munzer T. "H3 Laying Out Large Directed Graphs in 3D Hyperbolic Space" 1997 Los Alamitos, CA, USA, IEEE Comput. Soc. pp. 2-10, 114.

Herman I. et al. "Graph Visualization and Navigation in Information Visualization: Survey" IEEE Transactions on Visualization and Computer Graphics, Jan.-Mar. 2000, vol. 6, No. 1 pp. 24-43.

Anderson, James W., "Hyperbolic Geometry," Springer-Verlag London Limited, Great Britain, 1999.

* cited by examiner

LOCAL RELATIVE LAYOUT OF NODE-LINK STRUCTURES IN SPACE WITH NEGATIVE CURVATURE

FIELD OF THE INVENTION

The invention relates to laying out a node-link structure in a space with negative curvature such as hyperbolic space.

BACKGROUND AND SUMMARY OF THE INVENTION

Lamping, J. and Rao, R., "The Hyperbolic Browser: A Focus+Context Technique for Visualizing Large Hierarchies", *Journal of Visual Languages and Computing*, Vol. 7, 1996, pp. 33-55, disclose techniques for laying out a hierarchy on a hyperbolic plane such that distance between parent and child and between siblings is approximately the same everywhere. A recursive algorithm lays out each node based on local information, allocating a wedge of the hyperbolic plane for the node's descendants. The algorithm places all the children along an arc in the wedge, at an equal distance from the parent node, and at least a minimum distance apart from each other. The layout of a node depends only on the layout of its parent and on the node structure of two or three generations starting from the parent. Therefore, the layout can be done incrementally, such as by initially laying out the nodes nearest the root and by then adding more nodes as more of the structure is traversed. Lamping et al., U.S. Pat. No. 5,590,250, disclose similar layout techniques in which each node has a data structure that includes its position and radius and, if it has children, a link to a list of children; complex numbers are used to represent positions in the hyperbolic plane.

Munzner, T., and Burchard, P., "Visualizing the Structure of the World Wide Web in 3D Hyperbolic Space", in *Proceedings of the VRML '95 Symposium* (San Diego, Calif., Dec. 13-16, 1995), ACM SIGGRAPH, 1995, pages 33-38, disclose techniques for layout of a graph in the hyperbolic plane that can be used with directed graphs with cycles. The hyperbolic length of an edge connecting two nodes is obtained using hyperbolic functions and the angles between edges incident on the two nodes. Directed graphs with cycles can be embedded in hyperbolic manifolds-spaces which can wrap around and close up on themselves, or in standard hyperbolic space by filling in backlink edges.

Matsuura, T., Taniguchi, K., Masuda, S., and Nakamura, T., "A Graph Editor for Large Trees with Browsing and Zooming Capabilities", *Systems and Computers in Japan*, Vol. 24, No. 8, 1993, pp. 35-46, disclose a library program which allows direct manipulation of a large tree on a display. When a node or subtree is added or deleted, the data structure is updated; the layout for each node is calculated based on the graph layout algorithm, and each node and edge is redrawn. The layout algorithm determines, for each non-root node, a relative position value that is the difference between the node's x-coordinate and its parent's x-coordinate. The y-coordinate, on the other hand is determined by the level of the node, and therefore is determined when the coordinates of the root node are specified. When a part of the tree is deleted or a subtree is added, ancestors are traced to update the layout.

The invention addresses problems in laying out node-link structures in a space with negative curvature, such as hyperbolic space.

With the techniques described by Lamping and Rao and with other conventional techniques for negative curvature layout, if a structure changes after it is displayed, a new layout must typically be done for at least a large part of the structure as changed and then it must be redisplayed. Performing layout on a large structure is slow, and, when taken together with redisplay, may prevent a user from effectively interacting with the changed structure. Although these problems are especially acute for changing structures, they also arise when operations are performed that require frequent layout of a static structure or of parts of a static structure.

The layout techniques for static structures described by Lamping and Rao have certain characteristics that mandate layout of at least a large part of the structure. The layout techniques for static structures make decisions at each node that depend on layout decisions higher in the tree and at its sibling nodes; as a result, adding or deleting a child of a node mandates that the layout be redone for all descendants of the node and of any of its siblings. Also, the layout techniques for static structures save only the node's position in the hyperbolic plane; any change in the structure that would change a node's position requires repeating the layout of its siblings and all of its descendants.

The invention alleviates problems resulting from layout of large structures by providing techniques that make it possible to perform local layout of a node-link structure in a space with negative curvature such as hyperbolic space or the hyperbolic plane. The techniques obtain nearby relationship data for an element, indicating information about nearby node-link relationships. Then the techniques use the nearby relationship data to obtain layout data indicating the element's position relative to a parent in the space with negative curvature.

If the element and the parent are nodes, for example, the layout data can include position displacement data indicating a distance between the parent's position and the element's position and angle displacement data indicating an angular difference between an incoming link to the parent and the outgoing link from the parent to the element. In an especially elegant implementation, the layout data include only the position displacement data and the angle displacement data.

The nearby relationship data can be obtained by obtaining, for each of a set of children of the parent, a count of grandchildren of the parent. The set of children of the parent includes the element and can also include other children that are being or have been laid out in the negatively curved space. The counts of grandchildren can be used to obtain a radius and an angle for each of the set of children. The radii and angles can then be used to obtain a position displacement and an angle displacement between the parent and the element. The angle displacement can be compared with a previous angle displacement to determine whether to lay out children of the element.

The nearby node-link relationships can include only relationships among the parent and the parent's children and grandchildren.

The new techniques can be implemented iteratively, with each iteration identifying elements to be laid out and, for each identified element, obtaining nearby relationship data and layout data. For example, if a series of iterations is performed in response to an insertion or deletion event, the identified elements can include elements affected by the insertion or deletion. The identified elements for each iteration can also include elements added to the structure during a preceding iteration. Before the series, a weight can be obtained for each iteration, for use in obtaining layout data during the iteration.

The new techniques are advantageous in laying out a dynamic node-link structure because when an element is deleted or inserted only a few nearby elements need to be laid out again. The techniques also obtain an element's position relative to a parent rather than an absolute position, making it possible to change the position of an element and all its descendants by making a single change or a small constant number of localized changes in the data structure.

The new techniques are also advantageous because they can be used in a variety of situations in which it is desirable to lay out part of a node-link structure. Thus, the new techniques are not only applicable to a dynamic node-link structure, but also to a static structure that can only be laid out and displayed in fragments because not all of the structure is available in memory. The techniques are especially advantageous for laying out a tree that is a partial representation of a directed graph in which nodes have multiple in-links—a shared branch of such a tree need only be completely laid out once for all of its occurrences, since only the relative position of the uppermost elements will differ between occurrences.

The techniques are also advantageous for animation of a change involving only part of a structure. For example, if insertions or deletions are made in a structure, it may be desirable to animate the transition in a way that only changes positions of elements that are near the insertion or deletion. The techniques make it possible to rapidly perform a series of layouts, one for each animation step, in which only the positions of elements near insertions or deletions are changed. As a result, animation performance improves and a simpler animation algorithm can be used. The algorithm can continuously change only a small number of variables, such as an angle and radius for each node that is near an insertion or a deletion.

Another advantage is that the new techniques provide layouts from which a display can be generated starting at any arbitrary element, rather than always starting at the root node or at the bottom leaves of a structure as in conventional techniques.

Yet another advantage is that an element's position relative to its parent can always be expressed with adequate precision. In contrast, if an element's absolute position in a hyperbolic plane is used, a large structure could exhaust the available floating point numbers.

The following description, the drawings, and the claims further set forth these and other aspects, objects, features, and advantages of the invention.

DETAILED DESCRIPTION OF THE INVENTION

A. Conceptual Framework

Figure 1:
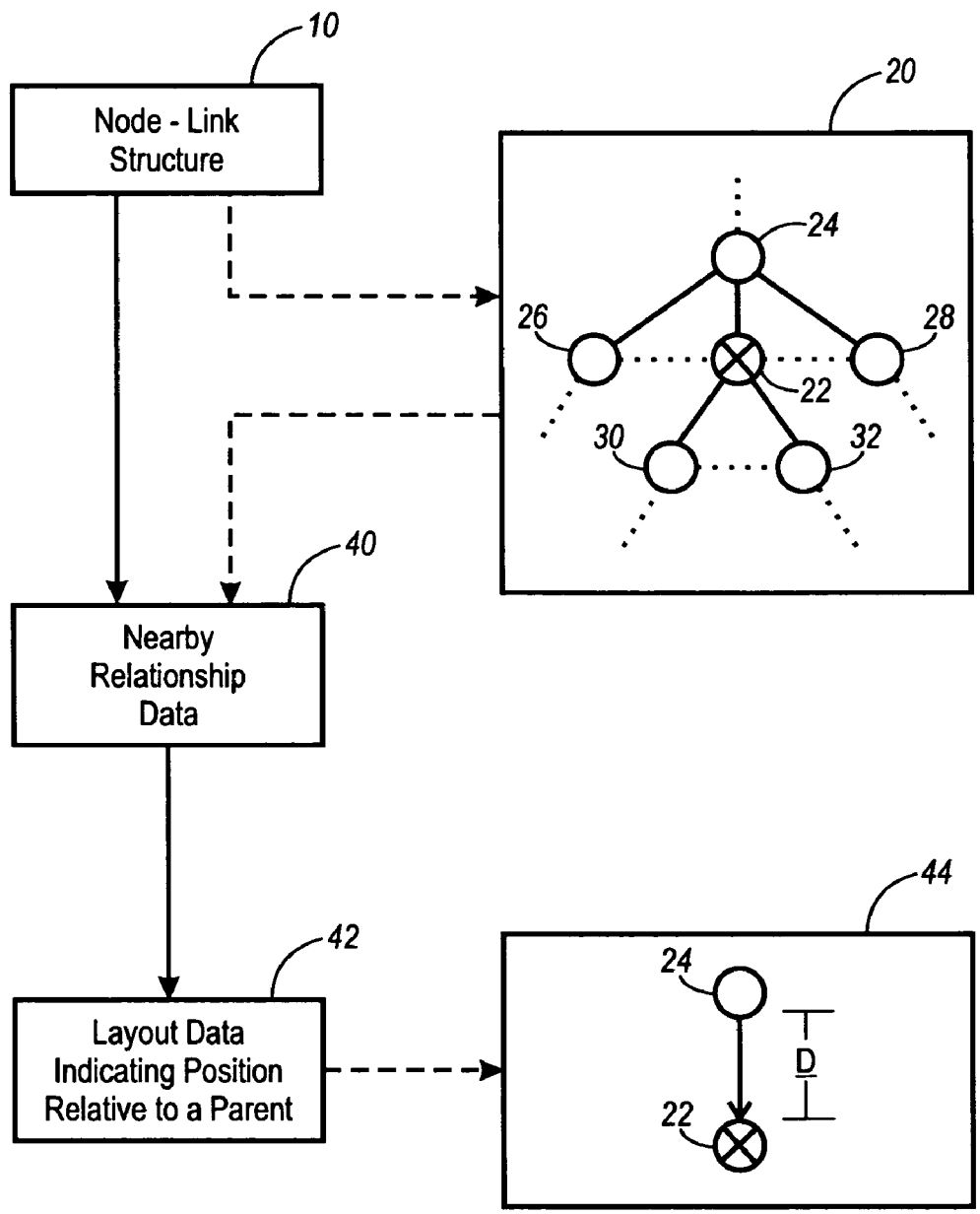
FIG. 1 is a schematic flow diagram showing how local relative layout can be performed for an element in a node-link structure.

The following conceptual framework, when taken with the conceptual frameworks set forth in U.S. Pat. Nos. 5,590,250 and 5,619,632, incorporated herein by reference, is helpful in understanding the broad scope of the invention, and the terms defined below have the indicated meanings throughout this application, including the claims.

A "node-link structure" is a structure that includes items that can be distinguished into nodes and links, with each link relating two or more of the nodes. A "graph" is a node-link structure in which each link relates two nodes. A "directed graph" is a graph in which each link indicates direction between the nodes it relates, with one node being a source or "from-node" of the link and the other being a destination or "to-node" of the link. An "acyclic directed graph" is a directed graph in which the links, when followed in their indicated directions, do not provide a path from any node back to itself. A "tree" is an acyclic directed graph with exactly one root node such that, for any non-root node in the tree, the links, when followed in their indicated directions, provide only one path that begins at the root node and leads to the non-root node.

The "elements" of a node-link structure are its nodes and links.

In a node-link structure, a "node-link relationship" is a relationship between elements based on paths of nodes and links between or among the elements.

In many cases, node-link relationships can be summarized by category. In a directed graph, for example, the "children" of an element are the elements that can be reached from the element by following no more than one link in its indicated direction. Similarly, the "parents" of an element are the elements that can be reached from the element by following no more than one link opposite its indicated direction. Children and parents of a node thus include links and nodes, while children and parents of a link include only nodes. The "descendants" of an element include all of its children, the children of its children ("grandchildren"), etc. The "ancestors" of an element include all of its parents, the parents of its parents ("grandparents"), etc. The "siblings" of an element include all the other children of its parents. The "co-parents" of an element include all the other parents of its children.

More generally, it is useful to distinguish node-link relationships based on shortest path lengths between elements, where path length is measured by the number of elements in the path. In a directed graph, for example, a node's "nearest" node-link relationships would be with its incoming and outgoing links; then with other nodes that are its parent and children nodes; then with other incoming and outgoing links of its parent and children nodes; then with other nodes that are its grandparents, siblings, grandchildren, and co-parents; and so forth. A set of "nearby" node-link relationships of an element is a set of relationships in which all the shortest path lengths between elements meet an appropriate criterion for nearness, such as that all are shorter than a relatively short maximum length such as 2, 3, or 4. An example of a useful group of nearby node-link relationships is the group of relationships among an element's parent, the parent's children (including the element), and the parent's grandchildren.

An item of data "identifies" an element in a node-link structure if the item of data provides sufficient information to distinguish the element from other elements in the structure. For example, an item of data identifies an element if the item of data can be used to access data relating to the element rather than to access data relating to other elements.

The terms "space" and "position" have related meanings as follows: A "space" is a set of "positions" over any pair of which a distance measure for the space can be applied to obtain a distance between the pair of positions. Examples of types of spaces include one-dimensional spaces such as lines or rays; other n-dimensional spaces; continuous spaces; discrete approximations of continuous spaces; and so forth.

A "planar unit disk" or "unit disk" is a two-dimensional Euclidean space bounded by a circular perimeter, with first and second perpendicular axes that cross at the center of the perimeter, and with a radius along each axis from the center to the perimeter of one. As a result, each position in the unit disk can be uniquely identified by two coordinates, each between +1 and −1.

A "space with negative curvature" is a space in which parallel lines diverge. Therefore, through any position in a space with negative curvature that is not on a given straight line, there are multiple other straight lines parallel to the given straight line. An example of a space with negative curvature is hyperbolic n-space. A "hyperbolic plane" is a hyperbolic 2-space.

An operation "lays out" a structure in a space if the operation obtains data indicating positions in the space for elements of the structure. The structure is "laid our" in the space if data indicating such positions in the space has been obtained. The data could indicate absolute positions, such as with coordinate values measuring displacements from a set of universal references such as a coordinate origin, or the data could indicate relative positions, such as with coordinate values measuring displacements from a set of references based on the position of another element.

Data indicate an element's "position relative to a parent" if the data indicate one or more displacements that can be used to obtain an absolute position of the element from the absolute position of the parent. For example, a set of displacements that define a vector from a parent's position to an element's position indicate the element's position relative to the parent. Examples of types of displacements include position displacements indicating distances between positions, whether along coordinate axes or in the form of a magnitude, and angle displacements indicating angle differences, such as between an incoming link to a parent and an outgoing link from the parent to the element.

An operation "applies a criterion" if the operation uses a criterion to reach a determination, such as whether to lay out children of an element.

As used herein, a "series of iterations" is a series of operations that can be divided into two or more consecutive parts, each of which is referred to herein as an iteration. Although iterations in a series may differ significantly, each iteration after the first can typically use starting data produced by the preceding iteration to obtain ending data. Typically, each iteration's ending data can in turn be used by the following iteration as its starting data.

The term "navigation signal" is used herein to mean a signal that indicates that the user has greater interest in a part of a node-link structure than in other parts. For example, an "expand signal" indicates a request to present a representation of a graph in which the representation of an element of the graph is expanded, while a "contract signal" indicates a request to present a representation of a graph in which the representation of an element of the graph is contracted. Other examples include requests to present a part of the node-link structure at a specific position, which can be done by selecting a bookmark or the like or by a point and click operation requesting that a feature pointed to be moved to a center of focus.

A signal "requests a change" in a node-link structure if the signal requests a change in one or more elements of the structure, such as an insertion or deletion of one or more elements or an operation such as moving or copying that can be implemented by a combination of insertions and deletions.

A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations.

A "network" is a combination of circuitry through which a connection for transfer of data can be established between machines.

B. General Features

Figure 2:
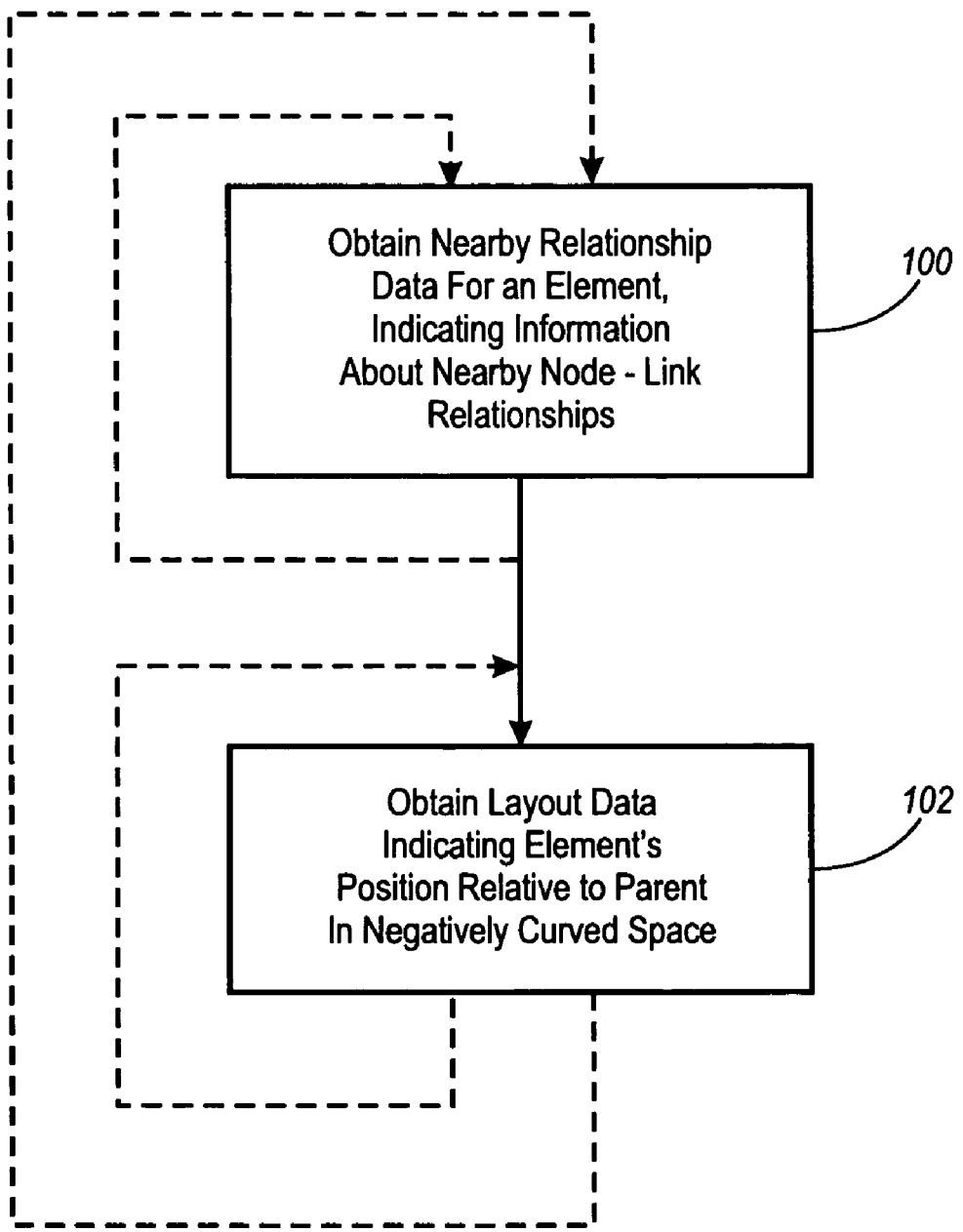
FIG. 2 is a flow chart showing general acts in performing local relative layout as illustrated in FIG. 1.
Figure 3:
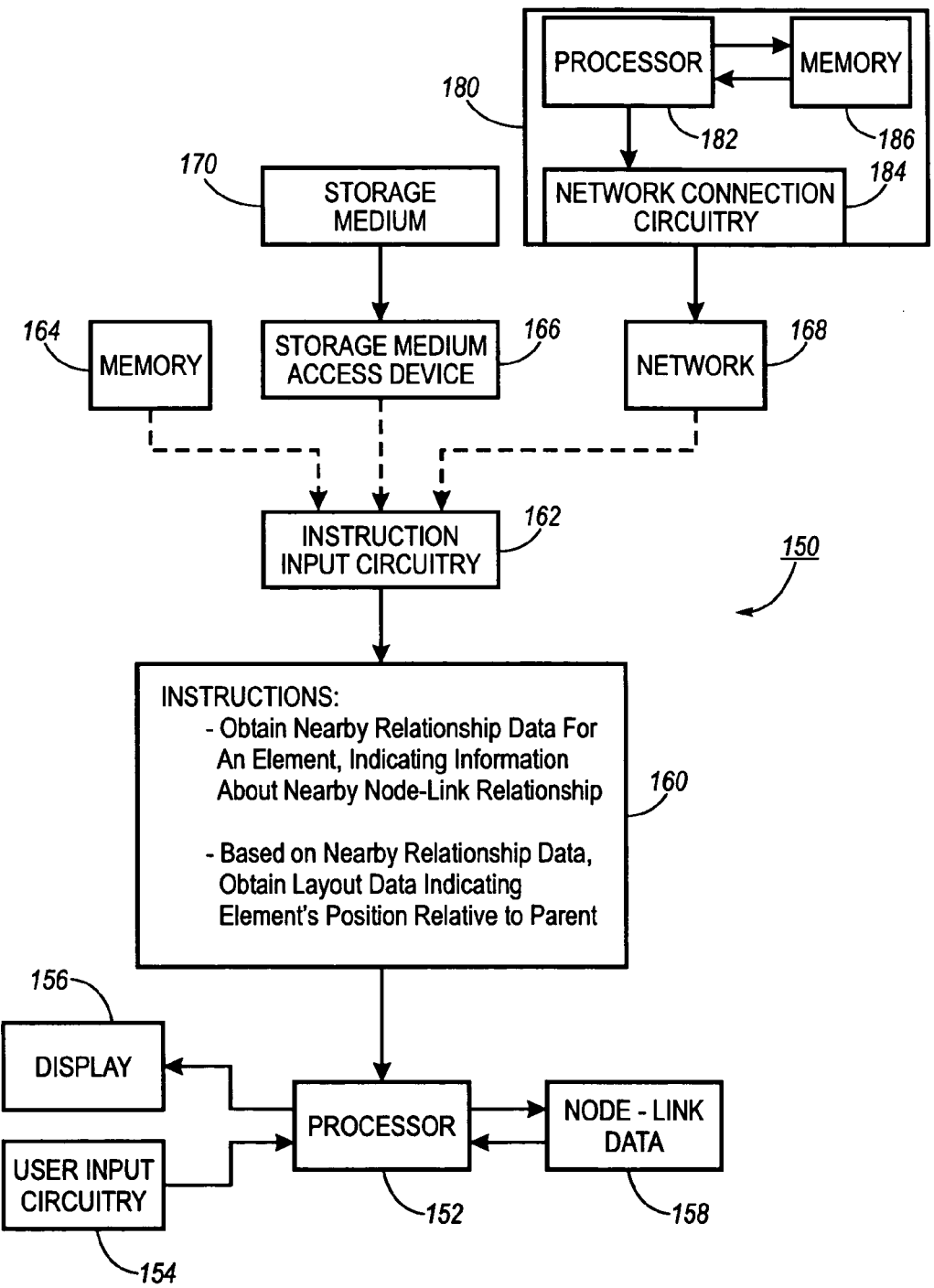
FIG. 3 is a schematic diagram showing general components of a machine that performs relative local layout as illustrated in FIG. 1.

FIGS. 1-3 show general features of the invention.

FIG. 1 illustrates how an element in node-link structure 10 can be laid out in a space with negative curvature. As illustrated by the dashed line to box 20, an element in node-link structure 10, illustratively node 22, has several nearby node-link relationships. As shown in box 20, nearby node-link relationships can, for example, include relationships resulting from a link to node 22 from parent node 24, links from parent node 24 to sibling nodes 26 through 28, and links from node 22 to children nodes 30 through 32.

As illustrated by the solid line from node-link structure 10 and by the dashed line from box 20, nearby relationship data 40 is obtained, indicating information about nearby node-link relationships of node 22. Then, layout data 42 for node 22 can be obtained based on nearby relationship data 40. Other information about node-link structure 10 could also be used in obtaining layout data 42, but such other information should preferably not include information about distant node-link relationships, to ensure that node 22 only needs to be laid out again when nearby node-link relationships are modified.

Layout data 42 may indicate various information about node 22 and its position in a space with negative curvature, including at least a position of node 22 relative to parent node 24. For example, as shown in box 44, layout data 42 can indicate a vector D indicating the distance and direction in the negatively curved space from parent node 24 to node 22. Just as position of a child can be defined relative to a parent's position, the direction from parent to child can be defined relative to the direction from grandparent to parent (or, if the parent is the root, relative to an initial direction). The vector D can thus indicate the position displacement from the parent and the angle displacement from the grandparent to parent direction.

In FIG. 2, the act in box 100 begins by obtaining nearby relationship data for an element in a node-link structure, indicating information about nearby node-link relationships of the element. As indicated by the inner dashed line around box 100, nearby relationship data can be obtained for each of a set of elements.

Based on the nearby relationship data obtained in box 100, the act in box 102 then obtains layout data indicating an element's position relative to a parent in the negatively curved space. As indicated by the inner dashed line around box 102, layout data can similarly be obtained for each of a set of elements for which nearby relationship data was obtained in box 100. As indicated by the outer dashed line around boxes 100 and 102, nearby relationship data can be obtained for another element or for another set of elements after obtaining an element's layout data.

Machine 150 in FIG. 3 includes processor 152 connected for receiving data indicating user signals from user input circuitry 154 and for providing data defining images to display 156. Processor 152 is also connected for accessing node-link data 158, which define at least part of a node-link structure. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 obtains nearby relationship data for an element, indicating information about nearby node-link relationships of the element. Processor 152 can access node-link data 158 to obtain information about node-link relationships. Then, based on the nearby relationship data, processor 152 obtains layout data indicating the element's position relative to a parent in a space with negative curvature.

As noted above, FIG. 3 illustrates three possible sources from which instruction input circuitry 162 could receive data indicating instructions—memory 164, storage medium access device 166, and network 168.

Memory 164 could be any conventional memory within machine 150, including random access memory (RAM) or read-only memory (ROM), or could be a peripheral or remote memory device of any kind. More generally, memory 164 could be a combination of more than one type of memory component.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used by machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to present node-link representations. An implementation described below has been implemented on a PC-based system running the 32 bit versions of Microsoft Windows and executing code compiled from C++ language source code.

C.1. System

Figure 4:
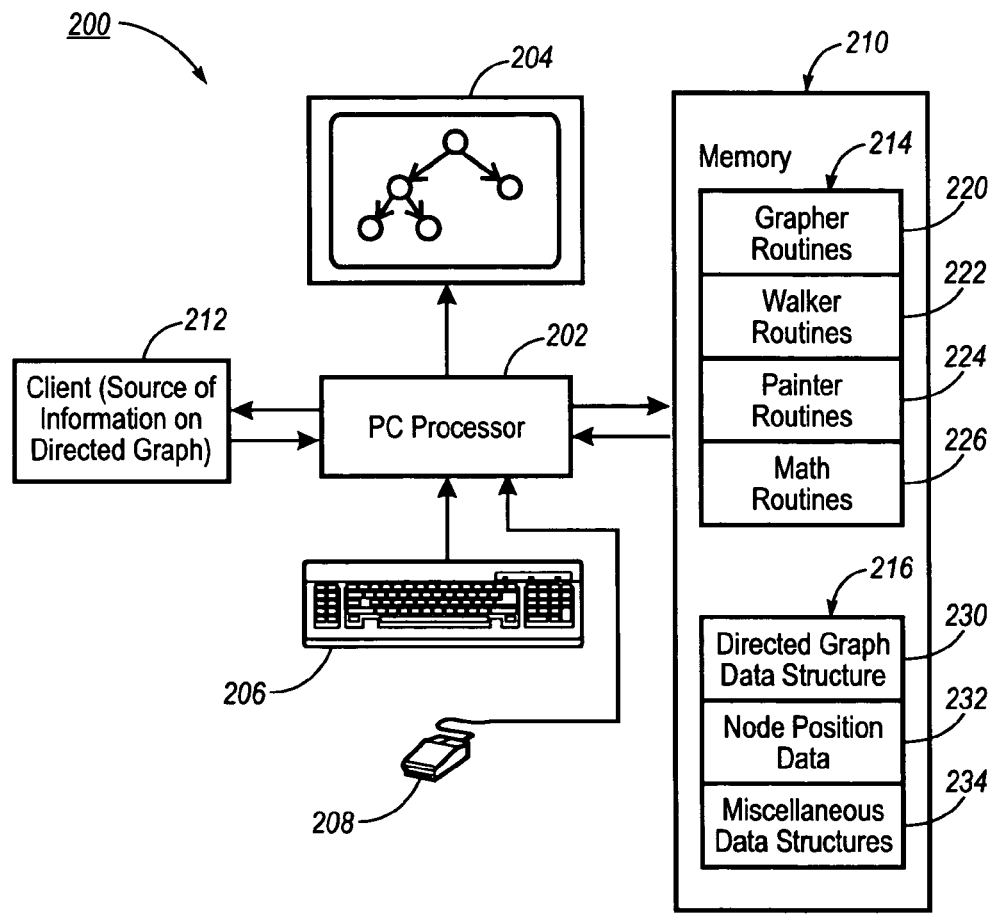
FIG. 4 is a schematic diagram of a system.

In FIG. 4, system 200 includes PC processor 202, which is connected to display 204 for presenting images and to keyboard 206 and mouse 208 for providing signals from a user. PC processor 202 is also connected so that it can access memory 210 and client 212. Memory 210 can illustratively include program memory 214 and data memory 216. Client 212 is a source of information about a directed graph, which could be a combination of routines and data stored in memory 210 or could be independent of memory 210 as shown. For example, processor 202 could communicate with client 212 through a network.

The routines stored in program memory 214 can be grouped into several functions. Grapher routines 220 create and modify a data structure representing the directed graph defined by the information from client 212. Walker routines 222 respond to navigation signals and other user signals from keyboard 206 and mouse 208 by obtaining information from the directed graph data structure. Painter routines 224 provide signals to display 204 to cause it to present representations of the directed graph data structure. Math routines 226 can be called to obtain positions of elements of the directed graph in a layout space.

Data memory 216 in turn contains data structures accessed by processor 202 during execution of routines in program memory 214. Directed graph data structure 230, as noted above, can be created and modified by grapher routines 220 and can also be accessed by walker routines 222 and painter routines 224.

Further details about the implementation of directed graph data structure 230 are set forth in copending coassigned U.S. patent applications Ser. No. 09/124,474, entitled "Controlling Which Part of Data Defining a Node-Link Structure is in Memory", and Ser. No. 09/124,338, entitled "Node-Link Data Defining a Graph and a Tree Within the Graph", both incorporated herein by reference.

Node position data 232, which can be linked to or included within directed graph data structure 230, can include positions of nodes in a negatively curved space such as a hyperbolic plane and in a rendering space such as a two-dimensional unit disk. Node position data 232 can be accessed by routines in program memory 214.

The routines in program memory 214 can also access various miscellaneous data structures 234. Data structures 234 may, for example, include an extra data structure for mapping from a pair of node IDs to a link ID, implemented as a standard heap; this extra data structure allows lookup and insertion of a link ID in constant expected time.

C.2. Responding to Events

Figure 5:
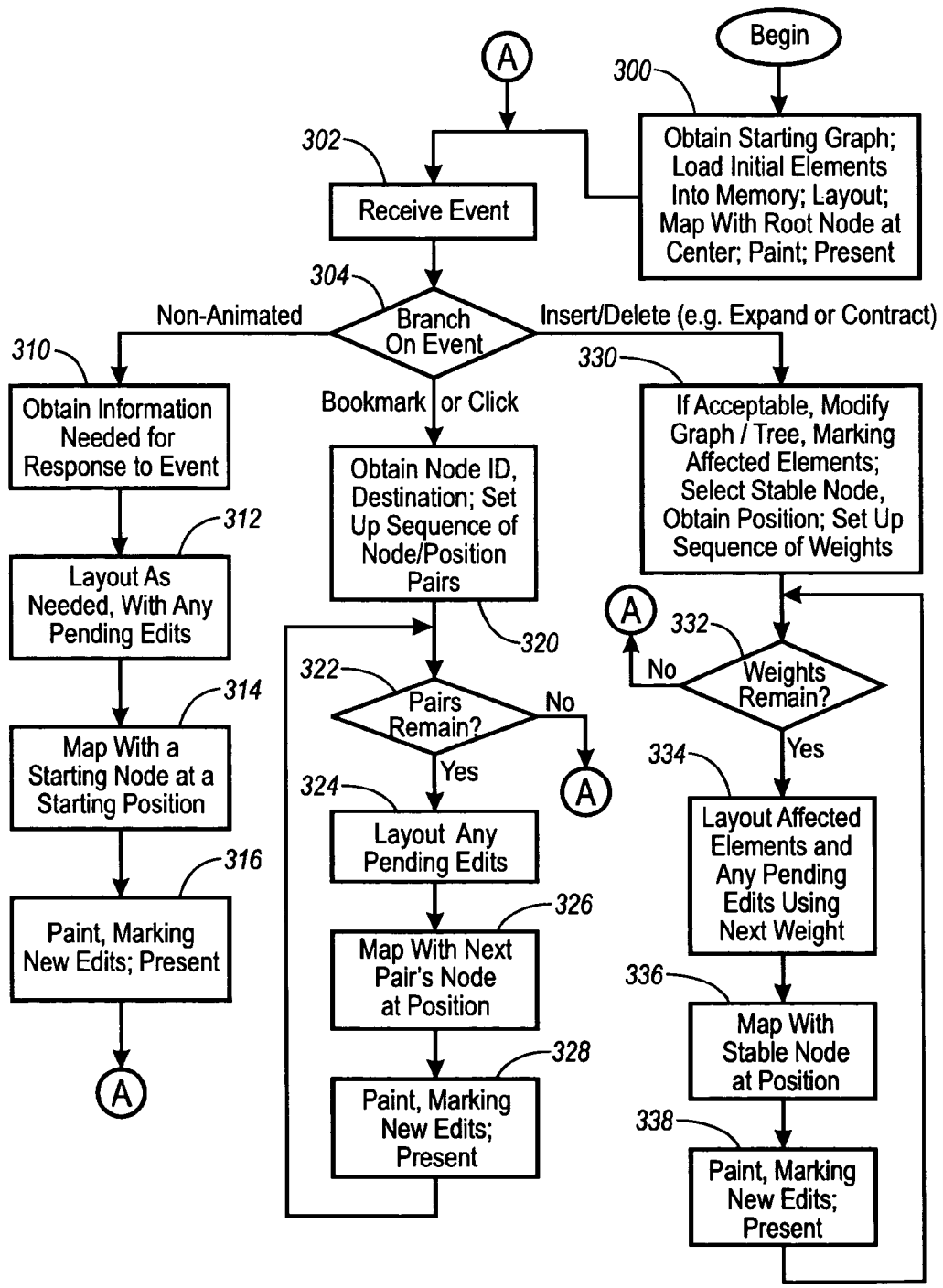
FIG. 5 is a flow chart showing how the system of FIG. 4 can respond to events by presenting representations of a directed graph.

FIG. 5 shows how the system of FIG. 4 can respond to events by presenting representations of a graph.

In box 300, client 212 begins by obtaining a starting graph and by loading an initial set of elements into memory, such as through calls to create nodes as described in copending coassigned U.S. patent application Ser. No. 09/124,474, entitled "Controlling Which Part of Data Defining a Node-Link Structure is in Memory", incorporated herein by reference. Expansion flags define a tree within the initial set of elements, as described in copending coassigned U.S. patent application Ser. No. 09/124,338, entitled "Node-Link Data Defining a Graph and a Tree Within the Graph", incorporated herein by reference. Client 212 also makes appropriate calls to routines in memory 214 for layout of the tree in a hyperbolic plane, for mapping the tree from the hyperbolic plane to a unit disk with the root node at the disk center, for painting the mapped tree, and for presentation of the painted version on display 204 by swapping a double buffer, all in box 300.

In box 302, client 212 receives an event relating to the graph. The event could result from a navigation signal, an editing signal, or another type of signal from a user. Alternatively, the event could be received from another source, either within or external to system 200. In either case, the event could take the form of a call from within client 212, from one of the routines in memory 214, or from other instructions executed by processor 202. A series of received events could be held in a queue, so that box 302 could involve popping an event from a queue.

In response to the event received in box 302, client 212 initiates an appropriate response by making one or more calls to routines in memory 214. As indicated by box 304, the response depends on the type of event, so that a branch is taken based on the event.

The event may be a non-animated event, such as an orientation shift event, a stretch event, or a dragging event. An orientation event can result when the user indicates a new orientation for the root node. A stretch event can result when the user indicates a new stretch factor for the displayed representation. A dragging event, for example, can result when the user selects a position within the representation, such as by a mouse down click, and requests that it be moved by an appropriate gesture or other signal.

Client 212 begins the response to a non-animated event in box 310 by obtaining any information needed for responding to the event. For an orientation event, the information obtained in box 310 can include the new orientation. For a stretch event, the information obtained in box 310 can include the new stretch factor.

For a dragging event, obtaining information in box 310 is somewhat more complicated. Client 212 could obtain a node identifier (node ID) of the node nearest the selected position and could also obtain information about the requested motion. These items of information could be obtained in much the same way as illustrated by the function find-nearest-node described at cols. 71-72 and as described in relation to FIG. 14 of U.S. Pat. No. 5,590,250, incorporated herein by reference.

When client 212 has obtained the necessary information in box 310, it can conclude with appropriate calls to walker routines 222 and painter routines 224 for layout, mapping, and painting. For an orientation event, the root node must be laid out at the new orientation. For a stretch event or a dragging event, layout is not needed. For a stretch event, the call to walker routines 222 must, however, include the new stretch factor, for use in mapping. Similarly, for a dragging event, the call to walker routines 222 must include the node ID of the nearest node and the next position along the path of motion, for use in mapping.

In box 312, walker routines 222 could first perform any necessary layouts in the hyperbolic plane, and could also lay out any pending edits of the tree. Then, in box 314, walker routines 222 could map the tree into the unit disk, beginning with a starting node at a starting position, in the manner described in copending coassigned U.S. patent application Ser. No. 09/124,529, entitled "Mapping a Node-Link Structure to a Rendering Space Beginning from any Node", incorporated herein by reference. For example, in response to a dragging event, the starting node could be the nearest node identified in box 310 and the starting position could be the next position along the path of motion. The starting node and starting position previously used for mapping could be used in response to an orientation or stretch event.

When the tree has been mapped, painter routines 224 can be called to paint the mapped tree in a display buffer, in box 316. During painting, painter routines 224 can mark new edits that occur in the tree as a result of node creation as described in copending coassigned U.S. patent application Ser. No. 09/124,338, entitled "Node-Link Data Defining a Graph and a Tree Within the Graph", incorporated herein by reference. Each edit can be marked by setting a flag or storing other appropriate data. When painting is completed, a swap of display buffers can be performed to present the tree as painted, thus providing a representation of the graph.

As noted above, these events are currently implemented as non-animated events. In response to an orientation event, the representation pivots to the new orientation, typically around the node at the focus of the display region. Similarly, in response to a stretch event, the representation expands or contracts radially, typically around the node at the focus. In response to a dragging event, the representation moves at a rate determined by the input signal. Client 212 could, however, provide an animated response to an orientation event, a stretch event, or a dragging event by converting the requested change into an equivalent sequence of smaller events, and issuing a series of calls in box 310, one call for each of the smaller events.

FIG. 5 also illustrates responses to two different types of events which are always treated as animated in the current implementation. The first type is a bookmark or click event, in response to which one node's position is moved during an animated sequence and other elements move to accommodate the one node's movement. The second type is an insert/delete event, in response to which one node remains stable during an animated sequence in which some elements are contracted, others are expanded, and still others move to accommodate the contractions and expansions.

A bookmark or click event could result when the user selects an item in a menu or other collection of bookmarks or selects a position within the representation with a mouse down-up click. In response to an event of this type, client 212 obtains a node ID and a destination position in the unit disk. In the case of a bookmark event, the node ID and destination position are previously stored and can be retrieved from memory. In the case of a click event, client 212 could obtain a node ID of the node nearest the selected position in much the same way as the function find-nearest-node described at cols. 71-72 of U.S. Pat. No. 5,590,250, incorporated herein by reference, and the destination could be a default position, such as the center of the unit disk.

In box 320, client 212 could call walker routines 222 with the node ID and destination position. Walker routines 222 can respond by performing an animation loop to present a sequence of representations in which the node moves from its previous position to the destination position. In box 320, walker routines 222 begin by setting up a sequence of node/position pairs, each including the node ID and a position in the unit disk. The positions can be obtained by obtaining a total translation from the previous position to the destination position, then obtaining and repeatedly composing an nth root of the total translation with a current translation as described in relation to boxes 470, 472, and 482 in FIG. 12 of U.S. Pat. No. 5,619,632, incorporated herein by reference. The number of node/position pairs can be large enough to ensure a smooth animation from the previous position to the destination position, with features representing elements of the structure maintaining object constancy during the animation. As an alternative to the nth root approach, the positions could be obtained by selecting an appropriate number of points along an appropriately chosen arc in the hyperbolic plane from the previous position to the destination position. The arc could be chosen to compromise between a straight line, which can appear unnatural, and the arc the node would have taken in the nth root method, which can require an excessive number of animation steps to appear smooth. The number of points could be chosen to ensure satisfactory animation.

In obtaining positions in box 320, orientation can be preserved as described in relation to FIG. 15 of U.S. Pat. No. 5,590,250, incorporated herein by reference. Alternatively, transformations or rotations can be chosen so that the position of a particular point on the boundary of the unit circle is preserved. The point chosen could, for example, be the point on the circle in the opposite direction from the direction in which the children of the root were laid out.

Walker routines 222 then perform an iteration of the animation loop for each node/position pair in the sequence, as indicated in box 322. In box 324, walker routines 222 could first lay out in the hyperbolic plane any pending edits of the tree, as described above in relation to box 312. Then, in box 326, walker routines 222 could map the tree into the unit disk, beginning with the node and position from the next node/position pair as the starting node and the starting position, as described above in relation to box 314.

When the tree has been mapped, painter routines 224 can be called to paint the mapped tree in a display buffer, in box 328. During painting, painter routines 224 can mark new edits that occur in the tree as a result of node creation as described above in relation to box 316. When painting is completed, a swap of display buffers can be performed to present the tree as painted, thus providing a representation of the graph.

When a new edit is marked in box 328 by painter routines 224, the new edit is laid out during the next iteration, in box 324. As a result, the animated sequence of representations, rather than showing a static node-link structure as in U.S. Pat. No. 5,629,632, shows a dynamic node-link structure. The edits, however, serve primarily to add features representing new nodes along the outer perimeter of the representation as the representation makes the transition from the previous position to the destination position. As a result, the added features do not interfere with or reduce the perception of object constancy for features representing other elements.

An insert/delete event could result when the user requests expansion or contraction of a node or requests some other modification of the graph or the tree. An insert/delete event could also be received in the form of a call, and could thus provide a mechanism for automatic modification of the graph or tree without concurrent human control.

In response to an event of this type, client 212 can first make appropriate calls to routines in memory 214 to determine whether the requested modification of the graph or tree is acceptable, in box 330. For example, a technique for determining whether an expand signal is acceptable is described in relation to FIG. 7 of copending coassigned U.S. patent application Ser. No. 09/124,338, entitled "Node-Link Data Defining a Graph and a Tree Within the Graph", incorporated herein by reference.

If the requested modification of the graph or tree is acceptable, client 212 can modify the graph or tree accordingly, making calls to routines in memory 214 as necessary. In the process of making the modification, each element that could be inserted, deleted, or changed by the modification, referred to herein as an "affected element", is marked, such as by setting a flag or storing other appropriate data. If a node is selected by an expand signal or a contract signal, its parent is also an affected node, because the area allocated to the parent may change. For most other insert/delete events, only nodes that are inserted or deleted are affected. Client 212 can then select a node as a stable node to be held at its previous position during animated presentation of the modification.

In many cases, the starting node used previously in mapping can be selected as the stable node, and it can be held at the previous starting position. In other cases, it may be desirable for client 212 to select a different stable node; for example, a node that is being expanded could be selected as the stable node, to be held at its current position, which thus becomes the new starting position. Therefore, unless client 212 selects a different stable node, the previous starting node and starting position are usually retained. But where the previous starting node is being deleted, another node must be selected as the default stable node subject to change by client 212.

When a deletion is being made, walker routines 222 can be called with the node IDs of the node being deleted and of its closest ancestor that will remain in the tree being mapped after deletion. This ancestor can be found by walking upward from the node being deleted until an ancestor is reached that is not being deleted by the current insert/delete event.

In response to this call, walker routines 222 can test whether the node being deleted is the previous starting node. If so, the identified ancestor can be selected to replace it as the starting node. If the ancestor has been recently mapped to a position that is displayed and that is available, that position can be selected as the starting position. If the ancestor has not been recently mapped, or was mapped to a position that is not displayed or that is not available because another element has now been mapped there, the starting position can be the center of the unit disk.

Also in box 330, client 212 could call walker routines 222 with the stable node ID and position. Walker routines 222 can respond by performing an animation loop to present a sequence of representations in which, first, deleted nodes are contracted at their previous positions, and then inserted nodes are expanded at their new positions, all while the stable node is held at its previous position. If the stable node cannot be held at its previous position because it was not recently mapped or was mapped to a position that is not displayed or is not available, it can be shifted to that position after deleted nodes are contracted with the previous starting node at the previous starting position, resulting in a sudden movement between contraction and expansion. Walker routines 222 begin by setting up a sequence of weights to govern the rate at which the area allocated to each affected node changes during contraction and expansion. The weights are separated by sufficiently small increments to preserve object constancy during animation.

Walker routines 222 then perform an iteration of the animation loop for each weight in the sequence, as indicated in box 332. In box 334, walker routines 222 could first lay out in the hyperbolic plane the affected nodes and any pending edits of the tree, using the iteration's weight. Then, in box 336, walker routines 222 could map the tree into the unit disk, beginning with the stable node and position, as described above in relation to box 314.

When the tree has been mapped, painter routines 224 can be called in box 338 to paint the mapped tree in a display buffer. During painting, painter routines 224 can mark new edits that occur in the tree as a result of node creation as described above in relation to boxes 316 and 328. When painting is completed, a swap of display buffers can be performed to present the tree as painted, thus providing a representation of the graph.

Whether there are pending edits or not, a series of iterations of the animation loop beginning in box 332 produces representations of a dynamic node-link structure because of the deletions and/or insertions. In addition, affected elements move to new positions from their positions prior to the deletions and insertions. The technique has been successfully implemented to produce object constancy during these movements.

After a representation is provided in box 316 or after an animation sequence is completed in box 322 or 332, another event can be received in box 302, as indicated by the circles labeled "A" in FIG. 5.

Animation details relating to the loops that begin in boxes 322 and 332 are discussed in more detail in copending coassigned U.S. patent application Ser. No. 09/124,528, entitled "Presenting Node-Link Structures with Modification", incorporated herein by reference.

C.3. Layout

Figure 6:
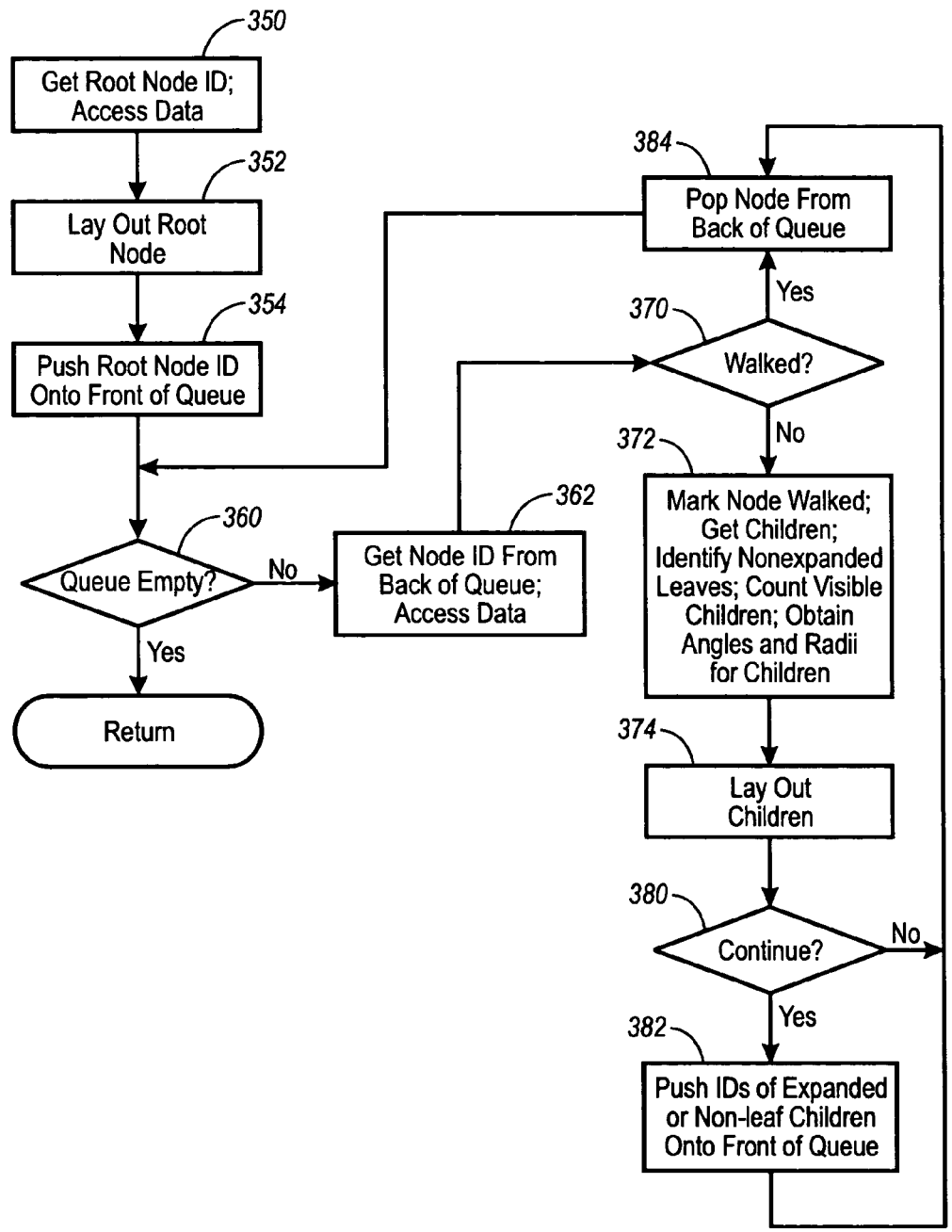
FIG. 6 is a flow chart showing how initial layout can be performed in FIG. 5.
Figure 7:
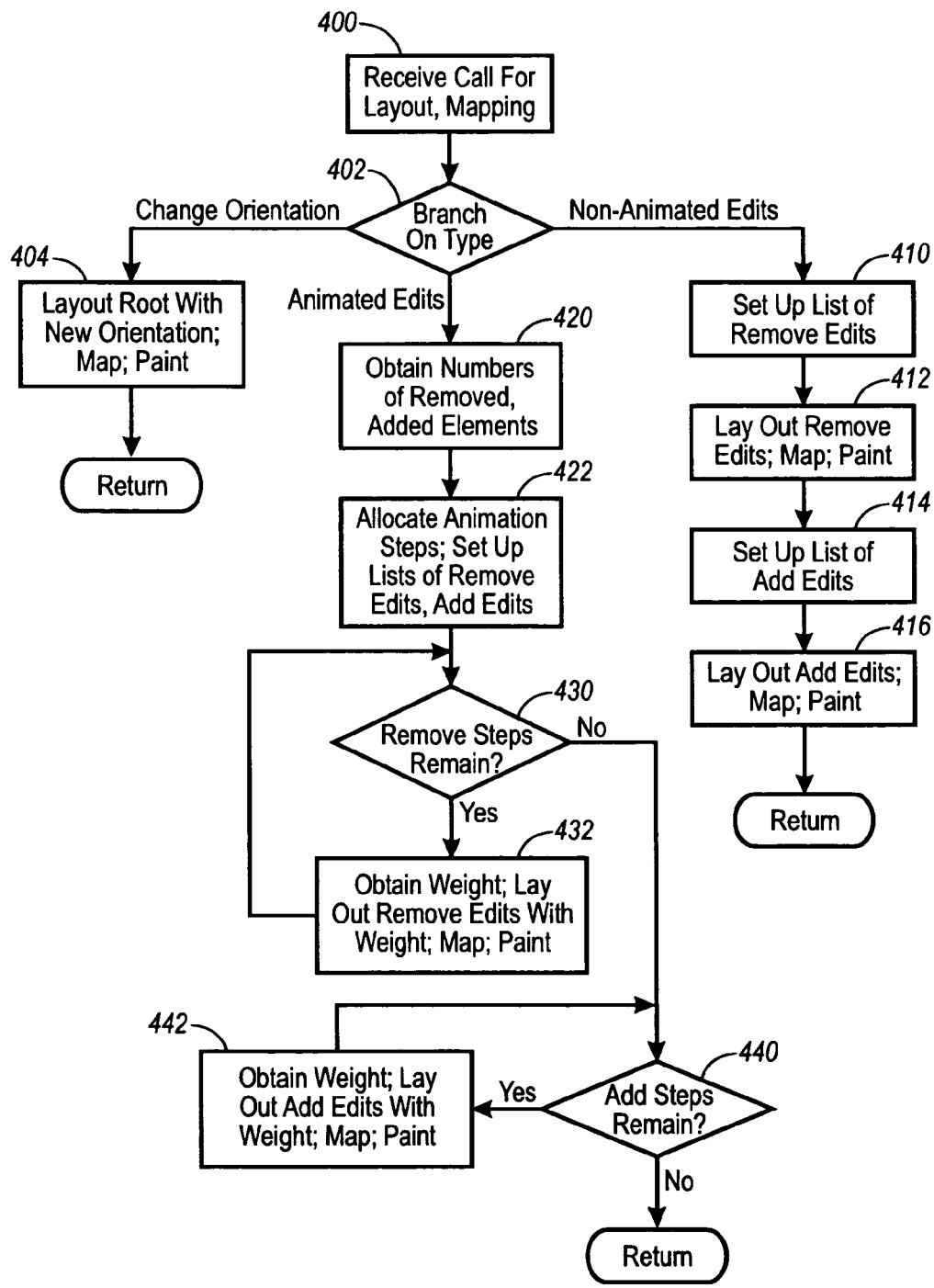
FIG. 7 is a flow chart showing how layout of a changed node-link structure can be performed in FIG. 5.

FIG. 6 shows how layout can be initially performed in box 300 in FIG. 5. FIG. 7 shows how layout of a changed node-link structure can be performed in boxes 312, 324, and 334.

As shown in box 350, walker routines 222 begin initial layout by obtaining the root node ID and using it to access data relating to the root node in directed graph data structure 232. In box 352, walker routines 222 lay out the root node by making a call to math routines 226 with an angle width. This could be any suitable angle that produces a desirable result. The angles $2\pi$ and $\pi/2$ have been successfully used, with $2\pi$ appropriate for a center layout style and with $\pi/2$ appropriate for a top, bottom, right, or left layout style. An interface could also be provided to modify this angle to obtain desirable results.

In response, math routines 226 lay out the root node at the origin of the unit circle, at coordinates (0, 0); with an upward orientation, at coordinates (0, 1); and with an angle half the angle width. Then, walker routines 222 push the root node ID onto the front of a queue in box 354.

In the remainder of FIG. 6, walker routines 222 iteratively traverse a set of elements of the tree defined by directed graph data structure 232, until the queue is empty, as indicated in box 360. Each iteration begins by getting the node ID from the back of the queue and using it to access data relating to the identified node in directed graph data structure 232.

In each iteration, the test in box 370 determines whether the node has already been walked in this traversal. If not, in box 372, walker routines 222 mark the node walked; get the node IDs of the children; identify which of the children are nonexpanded leaves, i.e. leaf nodes with no expanded incoming links; obtain the number of the children that are in the visible tree, as explained below; and call math routines 226 with the number N of children of the node that are in the visible tree to obtain arrays of angles and radii for the children in the visible tree, also explained below.

For the operations in box 372, the number of children in the visible tree N, which is a type of nearby relationship data, can be calculated in either of two ways: If the current traversal is part of a sequence of steps that add nodes, N is equal to the sum of the number of children prior to the traversal plus the number of children being added. If the current traversal is part of a sequence of steps that remove nodes, N is simply equal to the number of children prior to the traversal.

The arrays of angles and radii can be obtained in box 372 in a variety of ways. In one successful implementation, each radius is set to the value 0.7, while each angle is set to the smaller of $((N*\pi)/18)$ and $\pi$. Thus, for N<18, a node's angle will depend on the number of its children that are in the visible tree.

Then, in box 374, walker routines 222 call math routines 226 to lay out the children.

Two general principles of layout are applied in implementing box 374: First, spacing and angle between nodes are determined based only on information about nearby elements in the tree, i.e. nearby relationship data; and, second, the layout information obtained for each node indicates the relative position of a node to its parent in such a way that the position of a node and all its children can be shifted by a small change in the data structure.

A general strategy that can be followed is to start with a child's radius and angle from box 372, obtain approximate distances the child needs, use the approximate distances to obtain a distance from the parent, then use the distance from the parent to obtain more precise distances for the child, and then optionally use the more precise distances to obtain even more precise distances, and so forth.

According to the general strategy, if a child has radius R and angle $\Theta$ from box 372, the approximate distances D1 and D2 can be calculated as sin h(R) and tan($\Theta/4$), respectively. D1 and D2 can be used to obtain a total distance DT for all the children, where each adjacent pair of children are separated by the greater of the sums of their D1s and D2s, i.e. DT=$\Sigma$ (max(D1(i)+D1(i+1), D2(i)+D2(i+1))+max(D1(1), D2(1))+ max (D1(N), D2(N)), where the summation runs from i=1 to N−1, with N the number of children for which layout is being performed. If the parent has an available angle $\omega$, the distance DP from the parent can then be calculated as a sin h(DT/$\omega$). The children can then be positioned along the circumference of a circle of radius DP centered at the parent with the angles between them proportional to their separations.

DP can then be used to obtain more accurate distances for the children, as follows:

$$D1' = \sin h(DP) a \sin(\sin h(R)/\sin h(DP));$$

$$D2' = 2 \sin h(DP) a \tan(\tan(\Theta/4)/e^{DP}).$$

D1' and D2' can then be used to obtain a more accurate distance DP' to the parent, as above, and so forth until a desired level of precision is reached. At that point, the orientation of each child can be calculated as an angle offset from the orientation of the parent.

Note that the distances described above are expressed in true metrics in the hyperbolic plane. A distance D in the hyperbolic plane corresponds to a vector in the unit circle starting at the origin and going a distance tan h(D/2).

The general strategy thus obtains layout information based only on nearby relationship information about a node, its parent, and its siblings, including information about a sibling's children in the visible tree, as described above in relation to box 372. The general strategy obtains layout information indicating the distance from a child to its parent and an angle representing the difference in orientation between them.

The general strategy has been implemented in software that goes through the children with two iterative loops, but uses the first distance obtained without attempting to obtain more precise distances in the manner described above in relation to the general strategy. The first loop obtains and temporarily saves separations between adjacent children and a "slice size" for each child, and also obtains a total separation. This information is then used to obtain the distance to the parent. The second loop then obtains and saves the relative orientation and area of each child.

In the software implementation, if a child has radius R and angle $\Theta$ from box 372, distances D1 and D2 are calculated as set forth above in relation to the general strategy. D1 and D2 for each child are added to D1 and D2 for the previous child to obtain S1 and S2. A total separation ST is increased by the maximum of the child's S1 and S2, except for the first and last children, for which ST is increased by the maximum of the child's D1 and D2.

If the child's S1 is greater than its S2, S1 is saved as the child's separation, D1 is initially saved as the size of the child's slice, and, for the second and subsequent children, the previous child's slice size is adjusted to be the minimum of its previous slice size and its S1. Conversely, if the child's S1 is not greater than its S2, S2 is saved as the child's separation, D2 is initially saved as the slice size, and, for the second and subsequent children, the previous child's slice size is adjusted to be the minimum of its previous slice size and its S2. The last child's slice size, however, is adjusted to be the minimum of its previous slice size and the maximum of its D1 and D2, thus completing the first iterative loop.

Using the parent's angle ω, the distance DP from the parent in the unit disk can then be calculated as the greater of tan h(a sin h(ST/2ω)/2) or 0.5. DP is saved as part of the data relevant to the parent node.

For each child, the second iterative loop begins by calculating the angle (S/ST)2ω, where S is the saved separation for the child. The angle (S/ST)2ω is added to a running total which began at −2ω. The running total is saved with other data relevant to the child.

Math routines 226 can then calculate a new angle for the child by calling a function similar to the function "inside-angle" at columns 67 and 68 of U.S. Pat. No. 5,590,250, incorporated herein by reference. This function, referred to herein as "InsideAngle", starts with a distance ("dist") that has been moved into a wedge and an angle that is half of the wedge. InsideAngle takes as the operative angle the smaller of the starting angle and (π−ε) where ε may have a very small value such as 0.0001, thus avoiding problems in calculation of arctangent. InsideAngle obtains the transformation that would move a point at coordinates (dist, 0) on the unit circle to the origin. InsideAngle then applies this transformation to the complex coordinates of a point at the intersection of the perimeter of the unit circle with the ray starting at the origin whose angle with the horizontal is the operative angle. InsideAngle returns as the resulting angle the angle from the horizontal of the ray from the origin through the transformed point.

To obtain a child's angle, InsideAngle is called with the distance DP and with an angle calculated by multiplying the child's slice size from the first iteration by 2ω/ST. The angle returned by InsideAngle is compared with π/2, and the child's angle is the smaller of the two.

Before saving the child's new angle, math routines 226 save the child's previous angle. If the absolute value of the difference between the old and new angles exceeds a minimum value, math routines 226 also save data indicating that layout should continue, as discussed below.

Finally, the second iterative loop obtains a child's area or side space by calling a function similar to the function "room-available" at columns 67 and 68 of U.S. Pat. No. 5,590,250, incorporated herein by reference. This function, referred to herein as "RoomAvailable", starts with a distance D that has been moved into a wedge and an angle φ that is half of the wedge. RoomAvailable returns a distance to the edge of the wedge that is calculated by first obtaining the ratio $(1-D^2)/2D$, and by then dividing the ratio by sin φ to obtain an initial distance S. RoomsAvailable then returns the distance $((S^2-1)^{1/2}-S)$. To obtain a child's area, RoomAvailable is called with the same distance and angle that were used in calling InsideAngle, as described above. The distance returned by RoomAvailable is saved as a measure of the child's area.

Although the software implementation described above can save additional data, it is based on the discovery that only two items of data need to be stored for each node in order to be able to perform layout and mapping as described herein and in relation to FIG. 6 of copending coassigned U.S. patent application Ser. No. 09/124,529, entitled "Mapping a Node-Link Structure to a Rendering Space Beginning from any Node", incorporated herein by reference. One item indicates a distance or position displacement from the node to its children nodes in the hyperbolic plane. The other is an angle displacement in the hyperbolic plane between the extension of the incoming link to the node's parent and outgoing link from the parent to the node. These two items of data, or a handle that can be used to access them, can be included in a link's data item in a directed graph data structure as illustrated in FIG. 6 of copending coassigned U.S. patent application Ser. No. 09/124,338, entitled "Node-Link Data Defining a Graph and a Tree Within the Graph", incorporated herein by reference.

The test in box 380 applies an appropriate criterion to determine whether to continue layout to the next generation of nodes. As noted above in relation to box 374, the criterion can be whether any child node's angle has been modified by more than a small angular difference, such as 0.00001. If so, layout should continue.

In box 382, walker routines 222 push the ID of each child node that is expanded or not a leaf onto the front of the queue. Other child nodes could be marked walked in box 382, since they do not have children that will be laid out. When box 382 is completed or if the test in box 380 determines not to continue or the test in box 370 determines that the node is already walked, the back node on the queue is popped, in box 384, before returning to box 360.

FIG. 7 illustrates how layout of a changed node-link structure can be performed in boxes 312, 324, and 334 in FIG. 5. In each case, layout begins in response to a call that leads to layout and mapping, as shown in box 400. As illustrated by the branch in box 402, however, the manner in which layout is performed depends on the type of change being made in the node-link structure.

If the change is a change in orientation of the root node in response to an orientation event, walker routines 222 can call math routines 226 to lay out the root node at the new orientation before mapping and painting, in box 404. The root node can be laid out as described above in relation to box 352 in FIG. 6, but with the new orientation. The new orientation will then be used in mapping, changing the orientation of the representation.

If the change is a non-animated edit, as could occur in response to a stretch event, a drag event, a bookmark event, or a click event if edits are pending, walker routines 222 first set up a list of remove edits, in box 410, and then lay out the remove edits before mapping and painting, in box 412. Then, walker routines 222 set up a list of add edits, in box 414, and then lay out the add edits before mapping and painting, in box 416.

In the current implementation, the lists of edits are set up based on edit source lists that are maintained by various routines in memory 214, including grapher routines 220 and painter routines 224. Also, the current implementation relates to a tree defined by expanded links, as explained in copending coassigned U.S. patent application Ser. No. 09/124,338, entitled "Node-Link Data Defining a Graph and a Tree Within the Graph", incorporated herein by reference. One pair of edit source lists, designated "CollapsedLinks" and "ExpandedLinks" herein, includes edits for links selected by contract requests and expand requests, respectively, and can therefore be set up in box 330 in FIG. 5. The other pair, designated "RemovedLinks" and "AddedLinks" herein, includes edits for links that are deleted and inserted, respectively. Multiple copies of the edit source lists may exist for different purposes.

The list of remove edits set up in box 410 is based on RemovedLinks, while the list of add edits set up in box 414 is based on AddedLinks. In setting up a list in box 410 or 414, walker routines 222 access each edit in the appropriate edit source list, and use the edit to obtain appropriate entries for the list being set up. In each case, an edit in the edit source list is used to obtain a node ID of the child node of the edit's link and an edit identifier indicating the type of edit being performed.

A parent of the child node is added to the back of a list of affected nodes unless it is already on the list. The parent is the child node's expanded parent node or, if none of its parent nodes are currently expanded, its first parent node. If an edit from an edit source list relates to a child node that does not have a parent, it must relate to the root, and the root node is therefore put on the back of the list of affected nodes in that case.

At the end of the iteration for a link from a source edit list, the link's child node is also added to a list of children nodes before accessing the next edit in the appropriate edit source list for use in the next iteration. In this way, an iteration is performed for each edit on the edit source list until all edits have been handled to complete the lists of affected nodes and children nodes.

Then, in box 412 or 416, the edits are laid out using the lists, following a sequence similar to that in boxes 354 through 382 of FIG. 6 for each node in the list of affected nodes, pushing the node from the list rather than the root node onto the front of the queue and making several changes in box 372 as follows: In addition to identifying which children are nonexpanded leaves, layout in boxes 412 and 416 determines whether each child is on the list of children nodes. If so, layout multiplies the angle and radius for the child by a weight. In box 412, the weight is zero, so that the child is laid out in box 374 at approximately its previous position with an angle and radius of zero, and thus disappears. In box 416, the weight is one, so that the child is laid out in box 374 at its new position with its full angle and radius.

The operations in boxes 410 through 416 could also be implemented within an animation sequence, in which case remove edits could be handled during an initial part of the animation sequence and add edits could be handled during a subsequent part of the sequence. If on the other hand the non-animated edits result primarily from node creation during painting, as described above in relation to FIG. 5, the edits may only be add edits, and all currently pending edits could be handled in each step of the animation sequence.

If the change is an animated edit, as could occur in response to an insert/delete event such as a request to contract or expand an element, walker routines 222 first obtain the numbers of elements to be removed and added based on the source edit lists, in box 420. The number to be removed can be obtained by adding the numbers of elements in CollapsedLinks and RemovedLinks, while the number to be added can be obtained by adding the numbers of elements in ExpandedLinks and AddedLinks. Then, in box 422, walker routines 222 allocate the available animation steps between removing steps and adding steps, and also set up lists of remove edits and add edits, somewhat as in boxes 410 and 414 in FIG. 6. A simple allocation of animation steps is half removing steps and half adding steps, but if there are no elements to be removed, all the steps can be adding steps, and vice versa if no elements to be added.

In setting up lists of remove edits and add edits in box 422, walker routines 222 can perform as described above in relation to boxes 410 and 414 unless there are collapsed or expanded nodes. In the case of collapsed or expanded nodes, the node itself, in addition to its parent, is pushed onto the back of the list of affected nodes; then, the children of the node, rather than the node itself, are added to the list of children nodes. In other words, collapsing or expanding can be thought of as affecting two generations of nodes, unlike other operations that only affect one. Walker routines 222 set up two pairs of lists of affected and children nodes, one pair for remove edits and one for add edits.

The animation steps that remove nodes are then performed in the loop that begins with box 430, with a weight being obtained, with the remove edits being laid out with the weight, and with mapping and painting of an animation frame, in box 432. Similarly, the animation steps that add nodes are then performed in the loop that begins with box 440, with a weight being obtained, with the add edits being laid out with the weight, and with mapping and painting of an animation frame, in box 442. By removing nodes before adding nodes, the situation is prevented where the same node would appear in two places in a single frame. By performing a final step with the weight zero after removing nodes and another with the weight one after adding nodes, the technique can ensure that the final weight is zero or one, respectively.

A weight can be obtained in box 432 by subtracting the current remove animation step number from the number of remove animation steps, then dividing the difference by the number of remove animation steps, so that the weights go from one to zero during a series of remove animation steps. Similarly, a weight can be obtained in box 442 by adding one to the current add animation step number, then dividing the sum by the number of add animation steps, so that the weights go from approximately zero to one during a series of add animation steps.

The total number of animation steps, coupled with the animation speed, helps influence the perception of object constancy during animation. As can be understood from the above description of how the weights are obtained, the total number of animation steps determines the rate at which a removed or added element's area changes, thus indirectly determining the rate at which other elements must move in relation to the area of the removed or added element. A larger number of animation steps, appropriately allocated between removing steps and adding steps, is more likely to produce object constancy, provided a sufficient animation speed is maintained.

The technique of FIG. 7, when performed with an appropriate number of animation steps and at an appropriate speed, has successfully produced the perception of a set of nodes contracting and expanding somewhat like a fan would be folded and unfolded. By adjusting the radii and angles that are assigned to the nodes, different perceptions can be obtained, such as that deleted nodes are drawn into their parent or are squeezed off to infinity or that inserted nodes grow out of their parent or are pulled in from infinity. When only one of a group of children is deleted, it can appear to be squeezed off to infinity, but if all of the children are deleted as a group, as in contraction, all can appear to be drawn into their parent. Similarly, when one child is added to a group, it can appear to be pulled in from infinity, but if all of the children are inserted as a group, as in expansion, all can appear to grow out of their parent. Further, grandchildren can be squeezed off to infinity while children are drawn into their parent, with the rates adjusted so that the grandchildren appear stable and only the children appear to move.

C.4. Variations

The implementation described above could be varied in many ways within the scope of the invention.

An implementation similar to that described above has been successfully executed on processors of IBM compatible PCs, but implementations could be executed on other machines with any appropriate processors.

An implementation similar to that described above has been successfully executed using C++ in 32-bit Windows environments, but other programming languages and environments could be used, including non-object-oriented environments, and other platforms could be used, such as Lisp, a Unix environment, ANSI C, Pascal, and so forth.

An implementation similar to that described above has been successfully executed with node-link data presented in an XML-compliant format and in an experimental format, but the invention could be implemented with any suitable type of node-link data, whether static or dynamic, and accessible in any appropriate way, such as in memory or over a network.

An implementation similar to that described above has been implemented with each iteration preparing and presenting one representation or an animated series of representations of a graph in response to a navigation signal, but the invention could be implemented with other types of iterations invoked by other types of signals or calls.

An implementation similar to that described above has been successfully executed with navigation signals received from a keyboard and mouse and relating to a displayed representation or animated series of representations of a node-link structure like the representations disclosed in Lamping et al., U.S. Pat. No. 5,619,632 and in copending coassigned U.S. patent application Ser. No. 09/124,528, entitled "Presenting Node-Link Structures with Modification", both incorporated herein by reference. The invention could, however, be implemented with or without navigation signals; for example, elements could be moved around in response to different sortings of the children of a node or in response to the application of different filters to elements of a structure. Also, the invention could be implemented with any appropriate type of expand and contract signals or other navigation signals, including signals resulting from external queries, selection of a menu entry-like item requesting expansion below an indicated node or link, or selection of a menu entry-like item requesting expansion below the current focus. The navigation signals could instead relate to an illusory space like those produced by video games or virtual reality environments or a presentation space other than a display and navigation signals could instead be produced by any appropriate user input device, including other kinds of pointing devices and other kinds of devices for receiving alphanumeric or linguistic input such as voice, gestures, or other modes of user input. Further, the invention could be implemented with other types of representations of node-link structures. The invention could be implemented without animation or with any appropriate animation techniques.

The implementation described above obtains nearby relationship data relating to relationships among a parent, its children, and its grandchildren, but the invention could be implemented to obtain nearby relationship data relating to a different set of nearby node-link relationships, such as relationships that include more distant relatives of an element being laid out, whether additional generations above or below the element or additional lateral relatives. For example, grandparents of the element being laid out could be considered.

The implementation described above obtains layout data indicating, for a node, a position displacement and an angle displacement from its parent. The invention could, however, be implemented to obtain layout data for links, rather than or in addition to nodes. Further, the invention could be implemented to obtain layout data indicating relative position in any other appropriate way and indicating additional information.

The implementation described above obtains counts of grandchildren of an element's parent, and then uses the counts to obtain angles and radii of the parent's children, which in turn are used to obtain a position displacement and an angle displacement. The implementation performs specific computations as described above. The invention could be implemented to obtain nearby relationship data and layout data in any other appropriate way. For example, each child of a parent could have a weighting and the relative weightings of the children could be used to determine the space occupied by each child or to determine proportional distances from the children to the parent. Also, information about the available area around a node could be taken into account by obtaining a layout with the least overlap in areas. Layout results could be cached to minimize repetitive computation.

In the implementation described above, a node-link structure laid out in the hyperbolic plane is then mapped into the unit disk and then painted in accordance with copending coassigned U.S. patent application Ser. No. 09/124,529, entitled "Mapping a Node-Link Structure to a Rendering Space Beginning from any Node", incorporated herein by reference, but a node-link structure laid out in accordance with the invention could be laid out in any other appropriate negatively curved space, and then be handled in any other appropriate way, with or without mapping, or mapped and presented in any other appropriate way, including mapping it into any other appropriate rendering space and presenting it in any other appropriate display space, including three-dimensional rendering and display spaces.

The implementation described above determines whether to lay out a node's children by comparing an angle displacement obtained for the node with a previous angle displacement, but the invention could be implemented by laying out all descendants of each laid out node or by applying any other suitable criterion to determine which elements to lay out.

The implementation described above is suitable for laying out elements of a tree. The invention could be used to lay out elements of other types of node-link structures, such as graphs in general.

The implementation described above uses node-link data that include expansion flags of links to define a tree within a graph as disclosed in copending coassigned U.S. patent application Ser. No. 09/124,338, entitled "Node-Link Data Defining a Graph and a Tree Within the Graph", with memory management as disclosed in copending coassigned U.S. patent application Ser. No. 09/124,474, entitled "Controlling Which Part of Data Defining a Node-Link Structure is in Memory", both incorporated herein by reference, but the invention could be implemented with a node-link structure defined in any other appropriate way, and loaded into memory in any appropriate way.

The implementation described above employs a directed graph data structure in which a link is represented as an item in two linked lists, one for the outgoing links from its from-node and one for the incoming links to its to-node. Any other suitable data structure could be employed.

The implementation described above can handle directed graphs, including cyclic directed graphs, but the invention could be implemented for other types of graphs by converting other types of links to appropriate combinations of directed links or by otherwise providing a protocol for mapping the structure of a graph to a tree. For example, an undirected link between two nodes could be converted to a pair of directed links between the same nodes or could be assigned a direction based on an appropriate criterion. In general, a representation in which all undirected links have been converted to a pair of directed links is likely to be visually confusing, because each pair of directed links results in a cycle, but this confusing might be overcome by presenting cycles in another way.

In the implementation described above, acts are performed in an order that could in many cases be modified. For example, a depth-first walk rather than a breadth-first walk could be performed in FIG. 6.

Also, in the implementation described above, several software portions are distinguished, such as grapher, walker, painter, and math routines and the client, but the invention could be implemented with other combinations of hardware and software and with software organized in any appropriate way.

D. Applications

The invention has been applied in providing an interactive browser of node-link structures. The invention could be applied in a variety of contexts in which node-link structures are laid out for visualization. In particular, the invention could be applied in visualizing web-related structures such as the structure formed by a cached set of web pages or other web objects.

More generally, the invention could be applied to provide a browser for organization charts, file system hierarchies, hypertext hierarchies, world wide web connectivity structures, parts breakdowns, SGML structures, or any other large node-link structures. The browser could be used in editing structures or their contents.

E. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of laying out a plurality of elements of a node-link structure in a space with negative curvature, the method comprising:
    obtaining nearby relationship data for each element in the plurality, the nearby relationship data indicating information about nearby node-link relationships;
    based on the nearby relationship data for each element in the plurality, calculating element's position in the space with negative curvature; and
    storing the positions for each element in the plurality in a data structure such that after the positions for all elements in the plurality have been calculated, the position of each element in the plurality is stored in the data structure only relative to an element of the node-link structure other than a root element of the node-link structure.

2. A method according to claim 1, wherein said step of storing comprises the step of storing the positions for each element in the plurality in a data structure such that after the positions for all elements in the plurality have been calculated, the position of each element in the plurality is stored in the data structure only relative to a parent of the element.

3. A method as in claim 2, in which the elements in the plurality of elements are nodes, and in which the parents are nodes, and in which the position of each particular element in the plurality as represented in the data structure after the positions for all elements in the plurality have been calculated, includes position displacement data indicating a distance between the particular element and a parent of the particular element, and angle displacement data indicating an angular difference between an incoming link to the parent of the particular element and an outgoing link from the parent to the particular element.

4. A method as in claim 3, in which the position of each particular element in the plurality as represented in the data structure after the positions for all elements in the plurality have been calculated, includes only the position displacement data and the angle displacement data.

5. A method as in claim 2, in which the step of obtaining the nearby relationship data comprises, for a particular one of the elements in the plurality:
    for each of a set of children of the parent of the particular element, obtaining a count of grandchildren, the particular element being one of the set of children.

6. A method as in claim 5, in which the step of obtaining layout data comprises, for the particular element:
    using the counts of grandchildren to obtain, for each of the set of children, a radius and an angle; and
    using the radii and angles for the set of children to obtain a position displacement and an angle displacement between the parent and the particular element.

7. A method as in claim 6, in which the particular element has a previous angle displacement, the method further comprising the step of comparing the obtained angle displacement with the previous angle displacement to determine whether to lay out children of the particular element.

8. A method as in claim 2, in which the nearby node-link relationships include only relationships among the parent and the parent's children and grandchildren.

9. A method as in claim 1, in which the method is performed in each of a series of iterations, each iteration comprising the steps of:
    identifying elements to be laid out in the iteration;
    performing the steps of obtaining and calculating for each of the identified elements; and
    performing the step of storing for the identified elements.

10. A method as in claim 9, in which the series of iterations is performed in response to an event requesting an insertion or deletion, the identified elements including elements affected by the insertion or deletion.

11. A method as in claim 10, further comprising, before the series of iterations, the step of obtaining a weight for each iteration,
    each iteration comprising using the weight in performing the step of calculating each element's position in the space with negative curvature.

12. A method as in claim 9, in which the identified elements include elements added to the structure during a preceding iteration.

13. A method as in claim 1, in which the space with negative curvature is a hyperbolic plane.

14. A system comprising:
    a processor for laying out a plurality of elements of a node-link structure in a space with negative curvature, the processor, in laying out the node-link structure:
    obtaining nearby relationship data for each element in the plurality, the nearby relationship data indicating information about nearby node-link relationships;
    based on the nearby relationship data for each element in the plurality, calculating element's position in the space with negative curvature; and
    storing the positions for each element in the plurality in a data structure such that after the positions for all elements in the plurality have been calculated, the position of each element in the plurality is stored in the data structure only relative to an element of the node-link structure other than a root element of the node-link structure.

15. An article of manufacture for use in a system that includes a storage medium access device and a processor connected for receiving data accessed on a storage medium by the storage medium access device, the article of manufacture comprising:

a storage medium; and instruction data stored by the storage medium, the instruction data indicating instructions the processor can execute, the processor, in executing the instructions, laying out a plurality of elements of a node-link structure in a space with negative curvature, the processor, in laying out the plurality of elements:

obtaining nearby relationship data for each element in the plurality, the nearby relationship data indicating information about nearby node-link relationships;

based on the nearby relationship data for each element in the plurality, calculating element's position in the space with negative curvature; and storing the positions for each element in the plurality in a data structure such that after the positions for all elements in the plurality have been calculated, the position of each element in the plurality is stored in the data structure only relative to an element of the node-link structure other than a root element of the node-link structure.

16. A method of transferring data between first and second machines over a network, the second machine including memory and a processor connected for accessing the memory, the memory being for storing instruction data, the method comprising the steps of:

establishing a connection between the first and second machines over the network; and operating the first and second machines to transfer instruction data from the first machine to the memory of the second machine, the instruction data indicating instructions the processor can execute, the processor, in executing the instructions, laying out a plurality of elements of a node-link structure in a space with negative curvature, the processor, in laying out the plurality of elements:

obtaining nearby relationship data for each element in the plurality, the nearby relationship data indicating information about nearby node-link relationships;

based on the nearby relationship data for each element in the plurality, calculating element's position in the space with negative curvature; and storing the positions for each element in the plurality in a data structure such that after the positions for all elements in the plurality have been calculated, the position of each element in the plurality is stored in the data structure only relative to an element of the node-link structure other than a root element of the node-link structure.

* * * * *